(12) United States Patent
Hatano

(10) Patent No.: US 7,502,012 B2
(45) Date of Patent: Mar. 10, 2009

(54) INPUT DEVICE AND PERSONAL COMPUTER

(75) Inventor: Naoyuki Hatano, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 534 days.

(21) Appl. No.: 11/033,501

(22) Filed: Jan. 11, 2005

(65) Prior Publication Data

US 2005/0168439 A1    Aug. 4, 2005

(30) Foreign Application Priority Data

Jan. 16, 2004    (JP)    ............................. 2004-008993

(51) Int. Cl.
*G09G 5/00*    (2006.01)
(52) U.S. Cl. .................................... 345/156
(58) Field of Classification Search ................ 345/156, 345/157, 1.1, 161, 501, 519, 530, 520, 531, 345/522, 567, 556; 710/16, 72; 701/45; 711/100; 713/400, 600, 500, 501; 280/735
See application file for complete search history.

(56) References Cited

U.S. PATENT DOCUMENTS

| | | | | |
|---|---|---|---|---|
| 5,940,063 A * | 8/1999 | Komatsu | ..................... | 345/157 |
| 6,137,474 A * | 10/2000 | Komatsu | ..................... | 345/161 |
| 6,139,053 A * | 10/2000 | Knox | ......................... | 280/735 |
| 6,198,820 B1 * | 3/2001 | Tetsushi | ..................... | 379/413 |
| 6,788,291 B2 * | 9/2004 | Burry | ......................... | 345/161 |
| 2002/0190992 A1 * | 12/2002 | Satch et al. | ................. | 345/519 |
| 2004/0123001 A1 * | 6/2004 | Kikuchi et al. | ................ | 710/72 |

FOREIGN PATENT DOCUMENTS

JP    2003-36131    2/2003

* cited by examiner

*Primary Examiner*—Prabpdh Dharia
(74) *Attorney, Agent, or Firm*—Brinks Hofer Gilson & Lione

(57) ABSTRACT

A personal computer in which a returning from a power saving mode for further suppressing power consumption to a normal operating mode is possible by detecting an operation of stick-type coordinate input device is provided. Since a pressure sensor which is an input device connected to a I/O is comprised in a pointer, it is possible to output an operation signal from the pressure sensor to a CPU by pressing an operation grip, instead of distortion sensors which can not output the operation signal from a detecting circuit to the CPU due to the stop of a clock oscillator in the idle mode. Thereby, even in the idle mode in which the clock oscillator is stopped, the computer can return to the normal operating mode by the operation of the pointer which is not feasible in the prior art.

7 Claims, 5 Drawing Sheets

INPUT DEVICE AND PERSONAL COMPUTER

This application claims the benefit of priority to Japanese Patent Application No. 2004-008993, filed on Jan. 16, 2004, herein incorporated by reference.

BACKGROUND OF THE INVENTION

1. Field of the Invention

The present invention relates to a personal computer comprising a stick-type coordinate input device as an input means.

2. Description of the Related Art

Recently, in view of energy conservation, power management in personal computers has been promoted. Particularly, a portable personal computer known as a notebook computer generally uses a battery as a power source. Accordingly, in order to increase the operating time thereof as long as possible, the power saving is required.

As a means of saving the power of the personal computer, a personal computer comprising a function for switching a normal operating mode to a power saving mode for remarkably suppressing power consumption when the keyboard or the like is not operated is widely known.

In the power saving mode, there are generally a plurality of levels such as a sleep mode in which only a monitor screen or a hard disk is stopped and an idle mode in which even the clock oscillator of the CPU is stopped so that the power consumption is further suppressed in comparison with the sleep mode.

However, when the power saving mode is returned to the normal operating mode, in order to reduce the burden on the user, for example, in the notebook computer, it is switched to the normal operating mode when a press of the keyboard is detected (For example, see Japanese unexamined Patent Application Publication No. 2003-36131)

However, it is difficult for the user to operate a stick-type pointer (stick-type coordinate input device) which is easier to operate than the keyboard to return the power saving mode to the normal operating mode. In other words, in order to detect the tilting of the stick-type pointer; a detecting circuit for detecting a distortion sensor must be operated. The operation of the detecting circuit requires the driving of the clock oscillator of the CPU.

However, in the so-called idle mode for remarkably suppressing power consumption among the power saving modes, the clock oscillator of the CPU is stopped. Accordingly, the tilting of the stick-type pointer can not be detected in order to return the computer to the normal operating mode.

SUMMARY OF THE INVENTION

In view of above-mentioned problems, it is an object of the present invention to provide an input device or a personal computer in which a returning from a power saving mode for further suppressing power consumption to a normal operating mode is possible by detecting an operation of stick-type coordinate input device.

In order to accomplish the above-mentioned object, according to the present invention, a personal computer comprising a stick-type coordinate input device having an operating member, a distortion sensor for detecting a tilted operation of the operating member, and a pressure sensor for detecting a pressing operation of the operating member as an input means, and being capable of operating in any one operating state among a normal operating mode and at least one kind of power saving mode having lower power consumption than the normal operating mode, wherein the power saving mode is switched to the normal operating mode by the pressing operation of the operating member is provided.

The power saving mode is the state in which a clock oscillator constituting the personal computer is stopped. A screen display scroll is performed by a combination of the pressing operation and the tilted operation of the operating member.

According to the personal computer of the present invention, the returning from the power saving mode to the normal operating mode is possible by the operation of the stick-type coordinate input device having an operating frequency higher than that of a keyboard, thereby remarkably increasing the operability of the personal computer.

DESCRIPTION OF THE PREFERRED EMBODIMENT

Hereinafter, embodiments of the present invention will now be described with reference to the drawings.

Figure 1:
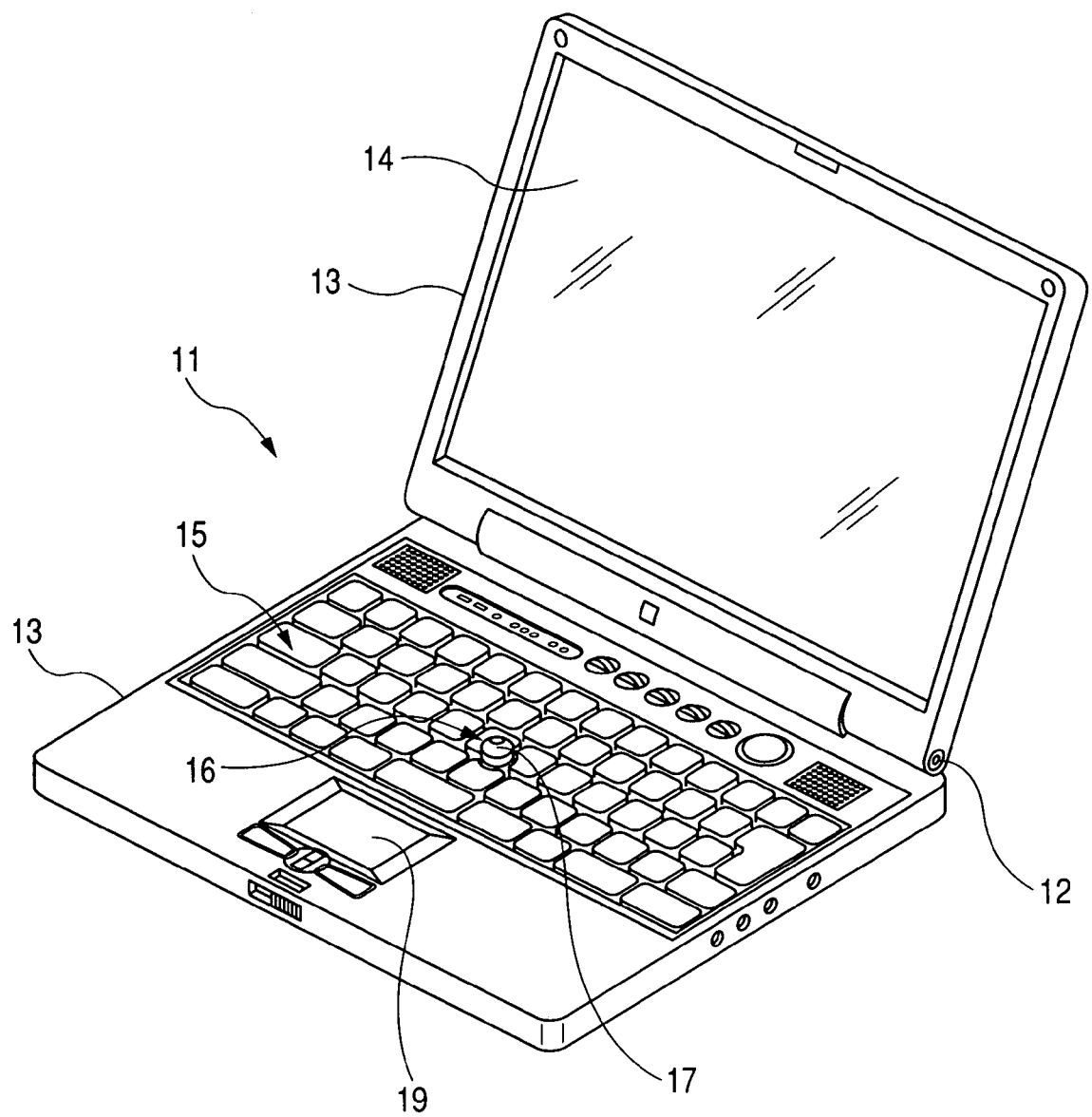
FIG. 1 is a perspective view showing a notebook computer having a stick-type coordinate input device.

FIG. 1 is a perspective view showing a portable personal computer having a stick-type coordinate input device according to the present invention. The portable personal computer (a notebook computer) 11 comprises a liquid crystal display panel 14 at one side of two case bodies 13 which can be folded together about a common rotation axis 12.

The other side of the case bodies 13 is formed with a keyboard 15 which is an input device of the notebook computer 11. Also, a stick-type coordinate input device (stick-type pointer) 16 is formed at the center of the keyboard 15. A pointer 16 is formed by cutting away a portion of the keyboard 15 and comprises a rod-shaped operating member 17 protruding from the case body 13. In addition, a touch pad 19 may be formed adjacent to the keyboard 15.

Figure 2:
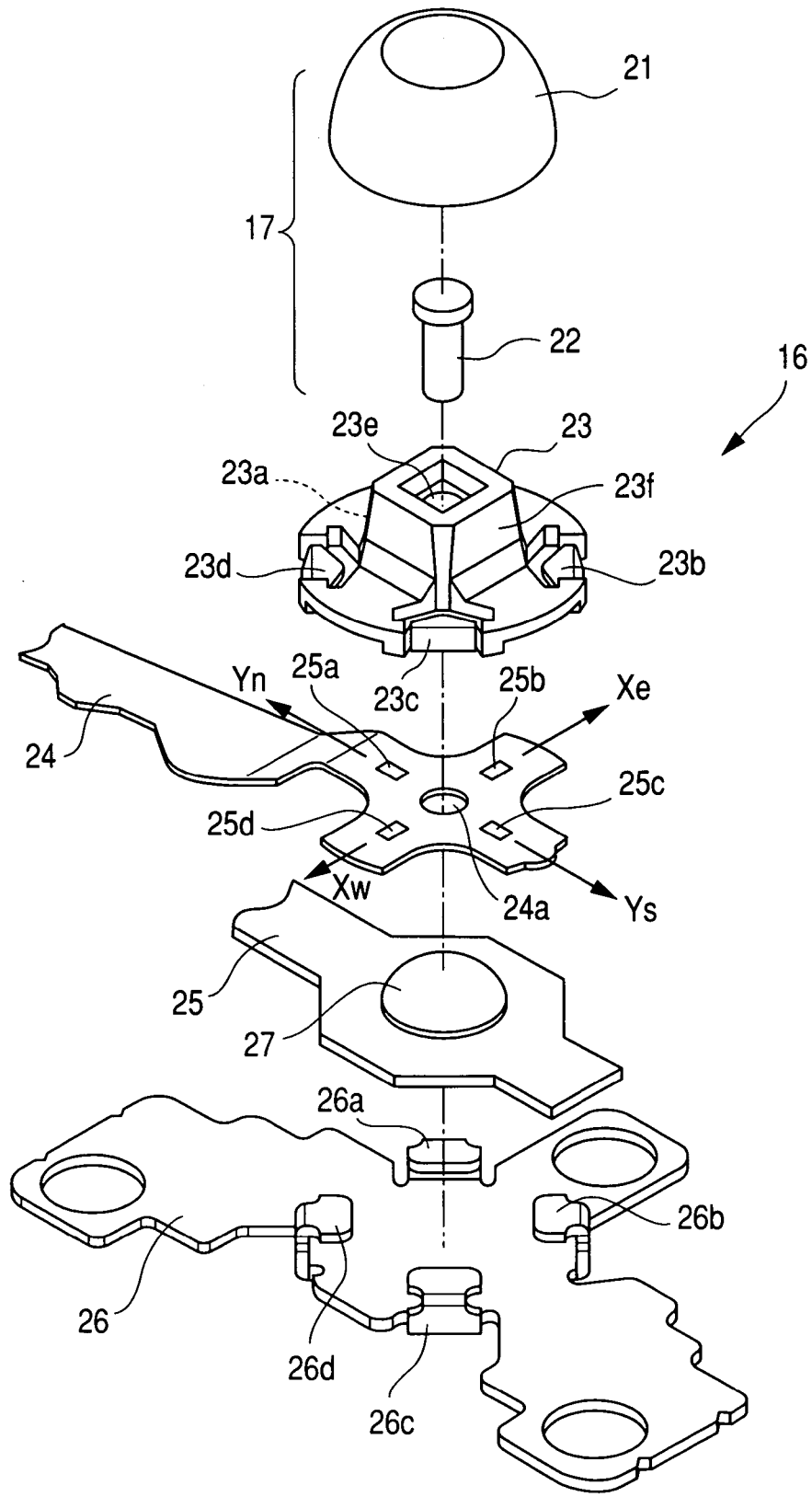
FIG. 2 is an exploded perspective view showing the stick-type coordinate input device of FIG. 1.
Figure 3:
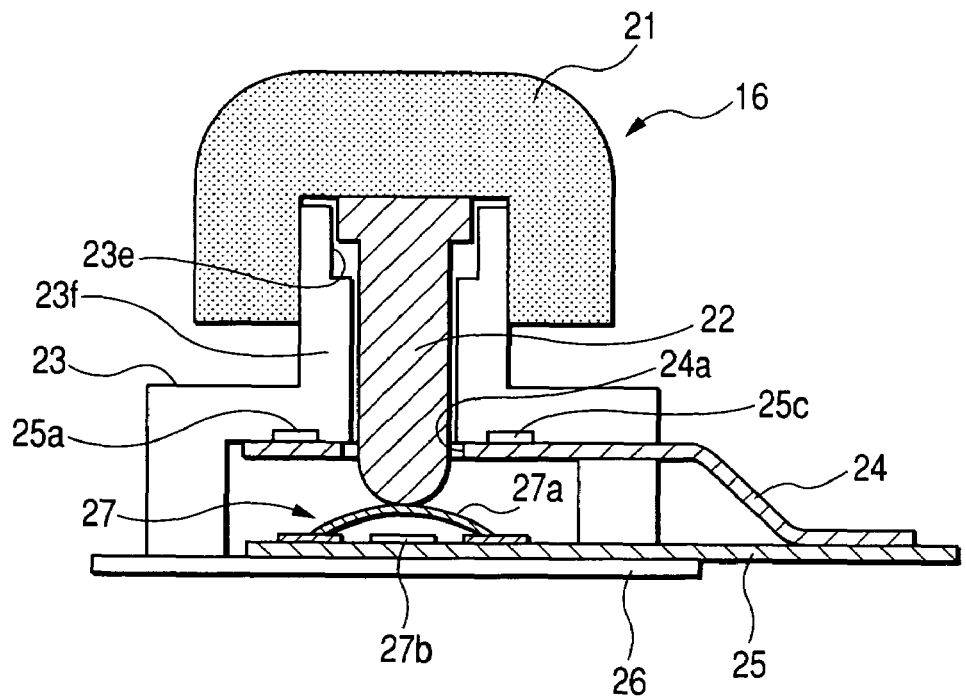
FIG. 3 is a cross sectional view showing the stick-type coordinate input device of FIG. 1.

FIG. 2 is an exploded perspective view showing the stick-type pointer and FIG. 3 is a cross sectional view thereof. The pointer 16 comprises an operation grip 21, a center rod 22, an operating body 23, first and second flexible substrates 24, 25 and a supporting substrate 26. The operation grip 21 is a substantially dome-shaped grip which is made of resin, and is engaged with the front portion of the center rod 22 at the inside thereof. The center rod 22 is the cylindrical shaft and is made of synthetic resin or metal. The lower end of the center rod reaches the second flexible substrate 25 through an opening 23e in the operating body 23. The operating member 17 is composed of the operation grip 21 and the center rod 22.

The first flexible substrate 24 is made of a resin film which can be warped and an opening 24a is formed at one end thereof. The center rod 22 which penetrates the operating body 23 passes through opening 24a. One end of the first flexible substrate 24 is formed with distortion sensors 25a to 25d surrounding the opening 24a in four directions. A sense current flows through the distortion sensors 25a to 25d, and a resistance value is changed by the distortion generated when a post 23f forming the operating body 23 at the four sides Xe, Xw, Yn, Ys on the two dimensional view shown in FIG. 2 is tilted and the tilting of the post 23f is detected.

Figure 4:
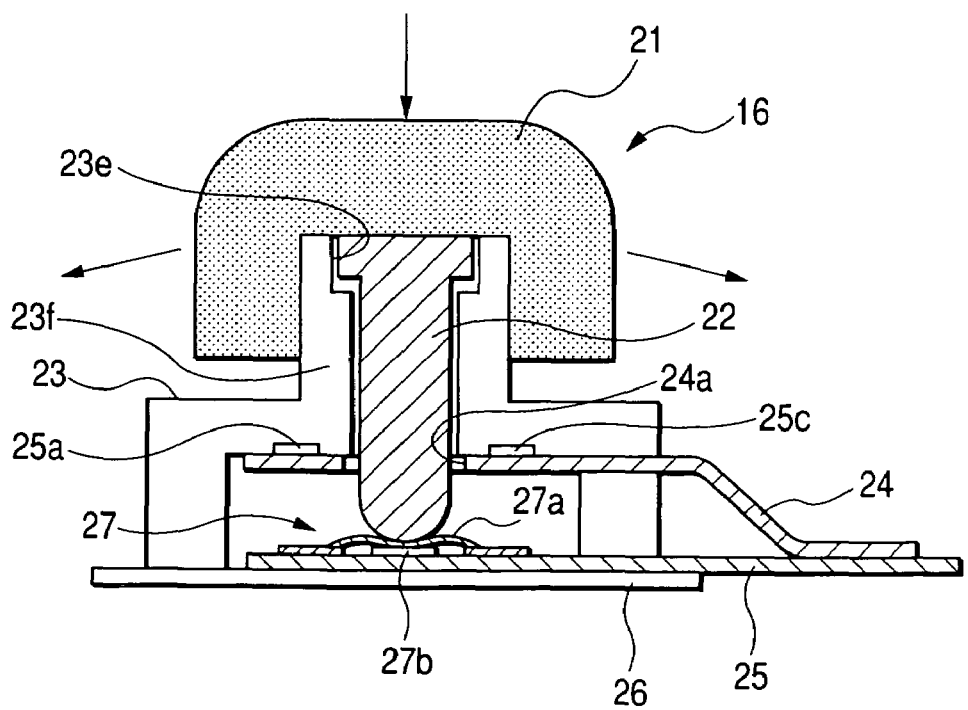
FIG. 4 is a cross sectional view showing the pressed state of the stick-type coordinate input device.

At the lower side of the first flexible substrate 24, the second flexible substrate 25 which is made of the resin film and can be warped is provided. A pressure sensor 27 is formed at one end of the second flexible substrate 25. The pressure sensor 27 is composed of thin metal plates which are expanded toward the upper side and can be warped, for example, a first contact piece 27a made of a copper plate and a second contact piece 27b formed apart from the lower side of the first contact piece 27a. The first contact piece 27a accommodates the front portion of the center rod 22 at the upper surface thereof and is warped by the press toward the lower side of the center rod 22 to be contacted with the second contact piece 27b (See FIG. 4).

The supporting substrate 26 is made of, for example, metal and engagement clicks 26a to 26d are integrally formed at one end of the supporting substrate. The engagement clicks 26a to 26d are movably engaged with engagement grooves 23a to 23d formed in the operating body 23. In addition, the first flexible substrate 24 is attached to the lower surface of the operating body 23. The pointer 16 having the above-mentioned structure is mounted on the keyboard 15 of the notebook computer 11 at the supporting substrate 26.

Figure 6:
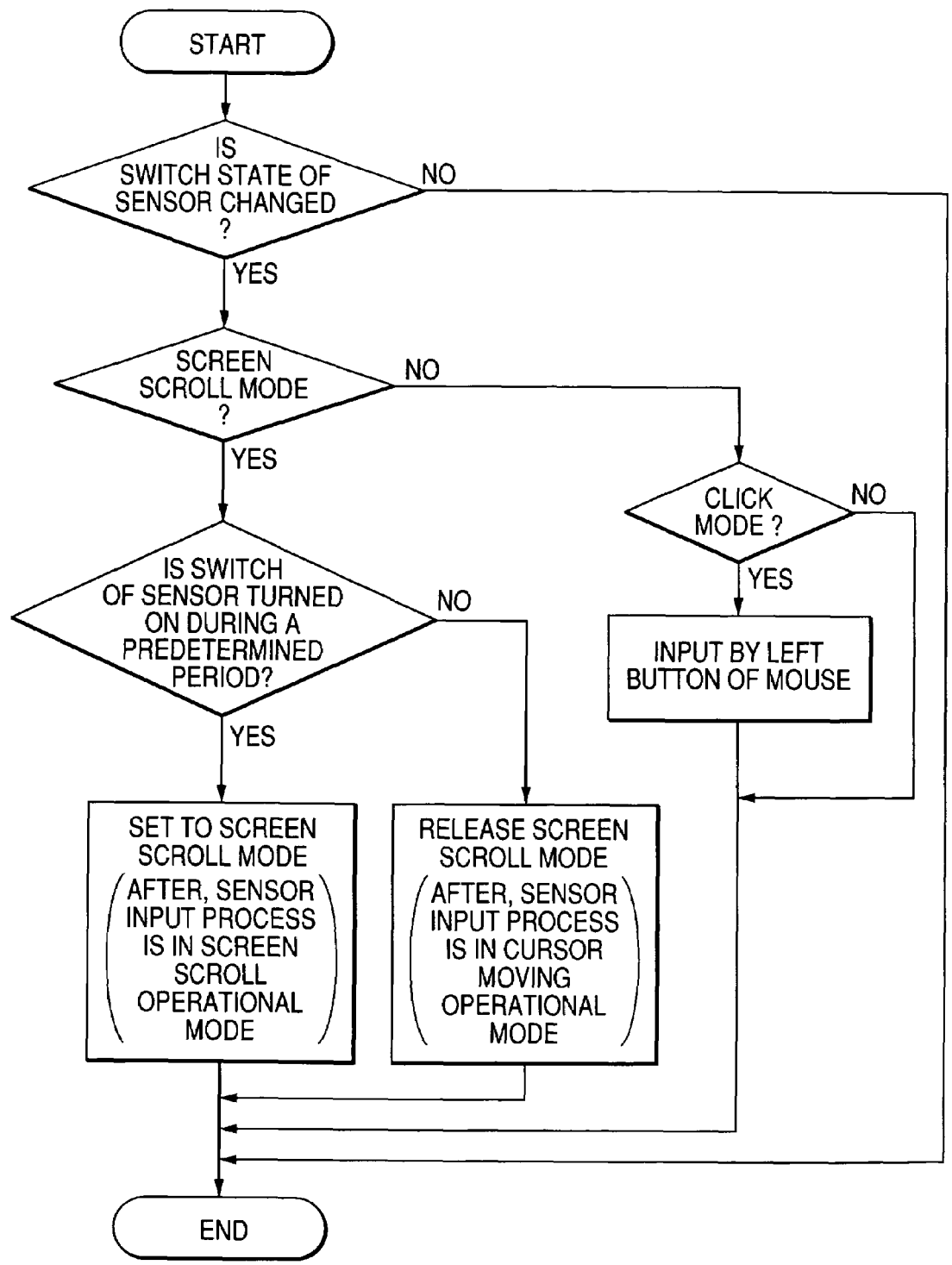
FIG. 6 is a flowchart showing the operation corresponding to the operation of the stick-type coordinate input device.

Now, the operation of the stick-type pointer 16 is described with reference to the flowchart shown in FIG. 6. Suppose that the user operates, for example, a cursor shown in the liquid crystal display panel 14 of the notebook computer 11 to move any file to a folder (drag operation). The user tilts the operation grip 21 of the pointer 16 toward the objective file on the screen. Then, the tilting of the post 23f is detected by the distortion sensors 25a to 25d to be transmitted to a controller of the notebook computer 11 as the tilt signal of the pointer 16. As a result, the cursor on the screen is moved along the direction that the post 23f was tilted.

When the cursor on the screen reaches the objective file, the operation grip 21 is released so that the post 23f is returned to the original location in the vertical direction. Then, the user presses the operation grip 21 downward while the cursor is overlapped on the objective file. Then, the front portion of the center rod 22 warps the first contact piece 27a of the pressure sensor 27 so that the first contact piece 27a and the second contact piece 27b come to contact and thus the press signal is transmitted to the controller of the notebook computer 11. When warping the first contact piece 27a, the user feels a click made by the first contact piece 27a as it deforms.

By providing such a click feeling, a sensory feedback of the pressing operation upon the selection and the input is realized and the sensory input confirmation as well as the input confirmation on the screen of the notebook computer 11 can be obtained, thereby remarkably improving the operability. In addition, the press signal is set to perform the functions corresponding to the normal click button of a mouse as the input means of a desktop type personal computer.

The user tilts the operation grip 21 toward the objective folder while maintaining downward pressure on the operation grip 21. Then, the tilt signal and the press signal of the post 23f are simultaneously output from the pointer 16 to move the file to the folder together with the cursor (drag operation). When the cursor overlapped on the file reaches the objective folder, the operation grip 21 is released so as to allow the file to be positioned in the destination folder.

In addition, it is preferable that the function corresponding to a mouse button double click is realized if the operation grip 21 is consecutively pressed twice. Also, it is preferable that the pressing operation of the operation grip 21 is also detected by the distortion sensors 25a to 25d. If the pressing operation of the operation grip 21 can be detected by both the distortion sensors 25a to 25d and the pressure sensor 27, the two-step pressing operation of the operation grip 21 can be realized.

For example, in the notebook computer 11, if the operation grip 21 is lightly pressed after moving the cursor to a certain location on the screen, it is detected that the output average value of the distortion sensors 25a to 25d generally exceeds a predetermined value, thereby the icon can become the selected state. Also, if the operation grip 21 is strongly pressed to the bottom thereof, the click feeling is obtained and the pressure sensor 27 is turned on so that a complex operation such as the operation of "decision" or "starting" for the selected icon can be performed.

Figure 5:
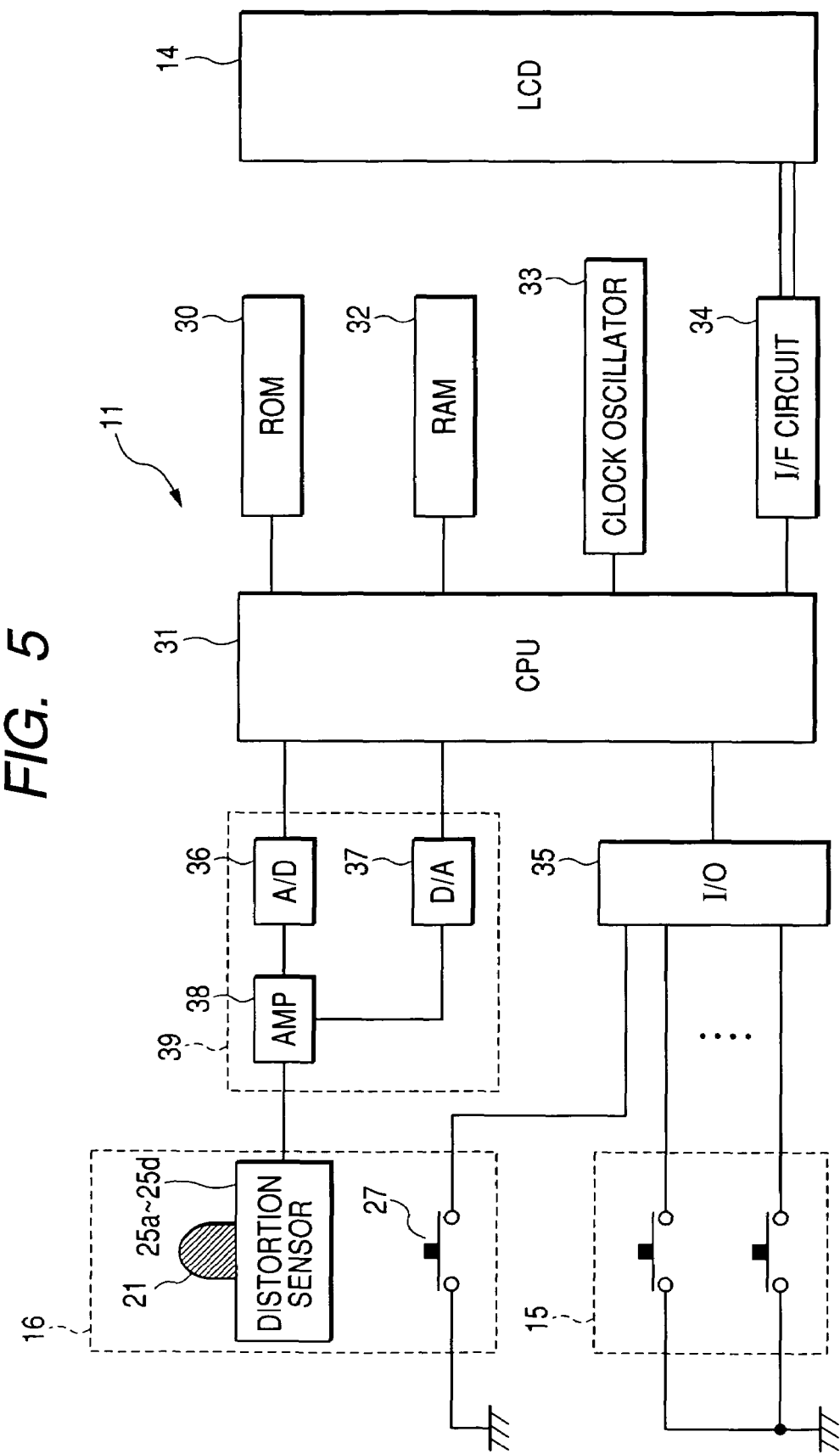
FIG. 5 is a block diagram showing the structure of the notebook computer.

The simple structure of the notebook computer comprising the above-mentioned stick-type pointer is shown in FIG. 5. The notebook computer 11 comprises a CPU 31 as well as a ROM 30, a RAM 32, and a clock oscillator 33, as are widely known. Also, the liquid crystal display panel 14 is connected to the CPU through an interface circuit 34.

As the input device of the notebook computer 11, a keyboard 15 and a pressure sensor 27 constituting the pointer 16 is connected to the CPU 31 through an I/O 35. Such an input device to which the I/O 35 is connected is characterized in that the operation signal can be output to the CPU 31 regardless of the operation of the clock oscillator 33 connected to the CPU 31.

On the other hand, the distortion sensors 25a to 25d constituting the pointer 16 are connected to the CPU 31 through a detecting circuit 39 which is composed of an A/D converter 36, a D/A converter 37 and an amplifier (AMP) 38. The distortion sensors 25a to 25d can detect the tilted operation of the operation grip 21 only when the detecting signal flows from the detecting circuit 39. Also, the detecting circuit 39 is operated by the actuation of the clock oscillator 33 connected to the CPU 31.

If the operation of the keyboard 15 or the pointer 16 is not performed during a predetermined period, the notebook computer 11 enters the power saving mode for saving power consumption by the control of the operating system OS. The details of such a power saving mode are different according to the version or the kind of the OS, but, for example, there is a power saving mode known as the sleep mode in which the clock oscillator 33 connected to the CPU 31 is operated while stopping the rotation of the hard disk (not shown) or the display of the liquid crystal display panel 14. Also, a power saving mode known as the idle mode occurs when the liquid crystal display panel 14 or the hard disk as well as the clock oscillator 33 are stopped so that the power consumption is reduced even further compared to the sleep mode.

Conventionally, when returning a notebook computer from an idle mode having very low power consumption to a normal operating mode, there was a need for a keyboard which is capable of outputting the operation signal to the CPU 31 even though the clock oscillator 33 does not operate.

However, since the notebook computer (personal computer) 11 according to the present invention comprises the pressure sensor 27 which is the input device connected to the I/O 35 inside the pointer 16, it is possible to output the operation signal from the pressure sensor 27 to the CPU 31 by pressing the operation grip 21 (See FIGS. 1 and 2) instead of the distortion sensors 25a to 25d, which can not output the operation signal from the detecting circuit 39 to the CPU 31 due to the stop of the clock oscillator 33 in the idle mode.

Thereby, even in the idle mode in which the clock oscillator 33 is stopped, the computer can return to the normal operating mode by operation of the pointer 16 which is not feasible in the prior art. Since the returning from the idle mode to the normal operating mode can be performed by the operation of the pointer 16 having the operation frequency higher than that of the keyboard 15, the operability of the notebook computer 11 can be remarkably increased.

In addition, although the tilting and the pressing of the operating member 17 can be simultaneously executed in the present invention, a rotation sensor for detecting the rotation of the center rod 22 of the operating member 17 may be further provided so that the tilting, the pressing and the rotation of the operating member 17 can be simultaneously performed. Thereby, more various operations can be realized.

Further, in the present embodiments, reference numeral 11 was described as a notebook computer. However, a portion except for the LCD 14 may be the input device and the LCD 14 may be a notebook computer body. Also in this case, the basic operation is substantially equal to the above-mentioned contents. It will be apparent that the present invention is efficient for the power management of the input device.

What is claimed is:

1. A personal computer comprising a stick-type coordinate input device having an operating member, a distortion sensor for detecting a tilted operation of the operating member, a pressure sensor for detecting a pressing operation of the operating member as an input means, and a keyboard, wherein an output of the pressure sensor is connected to an input/output (I/O) to which the keyboard is connected, the pressure sensor comprising an electrical switch including a first contact piece and a second contact piece, the personal computer having a central processing unit and being capable of operating in any one operating state among a normal operating mode and at least one kind of power saving mode having lower power consumption than the normal operating mode, wherein the distortion sensor operates based on actuation of the clock oscillator, wherein the pressure sensor outputs an operational signal to the central processing unit regardless of the operation of a clock oscillator, and wherein the power saving mode is switched to the normal operating mode by the pressing operation of the operating member.

2. The personal computer according to claim 1, wherein the power saving mode is the state in which a clock oscillator of the personal computer is stopped.

3. The personal computer according to claim 1, wherein a screen display scroll is performed by a combination of the pressing operation and the tilted operation of the operating member.

4. An input device comprising:
a central processing unit;
a stick-type coordinate input device having an operating member;
a distortion sensor for detecting a tilted operation of the operating member;
a pressure sensor including an electrical switch having a first contact piece and a second contact piece for detecting a pressing operation of the operating member as an input means, the input device being capable of operating in any one operating state among a normal operating mode and at least one kind of power saving mode having lower power consumption than the normal operating mode; and
a keyboard, wherein an output of the pressure sensor is connected to an input/output (I/O) to which the keyboard is connected, wherein the distortion sensor operates based on actuation of the clock oscillator, wherein the pressure sensor outputs an operational signal to the central processing unit regardless of the operation of a clock oscillator, and wherein the power saving mode is switched to the normal operating mode by the pressing operation of the operating member.

5. The input device according to claim 4, wherein a screen display scroll is performed by a combination of the pressing operation and the tilted operation of the operating member.

6. The input device according to claim 4, wherein the power saving mode is the state in which a clock oscillator of the input device is stopped.

7. The input device according to claim 4, further comprising:
a keyboard, wherein an output of the pressure sensor is connected to an input/output (I/O) to which the keyboard is connected.

* * * * *